United States Patent
Corbet et al.

(10) Patent No.: US 11,842,048 B2
(45) Date of Patent: Dec. 12, 2023

(54) PROCESS ACCELERATION FOR SOFTWARE DEFINED STORAGE

(71) Applicant: SOFTIRON LIMITED, Chilworth (GB)

(72) Inventors: Lionel Corbet, Milpitas, CA (US); Phillip Edward Straw, Newark, CA (US); Steve Hardwick, Austin, TX (US); Harry Richardson, Lamarsh (GB)

(73) Assignee: SOFTIRON LIMITED, London (GB)

( * ) Notice: Subject to any disclaimer, the term of this patent is extended or adjusted under 35 U.S.C. 154(b) by 108 days.

(21) Appl. No.: 17/505,890

(22) Filed: Oct. 20, 2021

(65) Prior Publication Data

US 2022/0121373 A1 Apr. 21, 2022

Related U.S. Application Data

(60) Provisional application No. 63/094,618, filed on Oct. 21, 2020.

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
CPC .... G06F 3/0614; G06F 3/0655; G06F 3/0608; G06F 3/0638; G06F 3/0679; G06F 9/5044; G06F 2209/509

USPC .......................................................... 711/154
See application file for complete search history.

(56) References Cited

U.S. PATENT DOCUMENTS

| | | | |
|---|---|---|---|
| 10,761,877 B2* | 9/2020 | Peffers | G06F 9/466 |
| 2017/0220506 A1* | 8/2017 | Brown | G11B 33/128 |
| 2018/0143815 A1* | 5/2018 | Dain | G06F 8/60 |
| 2020/0319915 A1* | 10/2020 | Raghunath | G06F 3/0676 |
| 2022/0116454 A1* | 4/2022 | Aharoni | G06F 3/067 |

OTHER PUBLICATIONS

International Search Report and Written Opinion, Application No. PCT/EP2021/079293, 11 pages, dated Jan. 26, 2022.

* cited by examiner

*Primary Examiner* — Hashem Farrokh
(74) *Attorney, Agent, or Firm* — Slayden Grubert Beard PLLC

(57) ABSTRACT

An apparatus includes a processor, a memory communicatively coupled to the processor, an acceleration framework circuit communicatively coupled to the memory and the processor, and a device driver. The device driver is configured to receive a request for data manipulation by a software defined storage (SDS) application. The device driver is configured to determine whether the request for data manipulation can be offloaded from the processor to the acceleration framework circuit. The device driver is configured to, based upon the determination of whether the request for data manipulation can be offloaded from the processor to the acceleration framework circuit, selectively cause the request to be executed by the acceleration framework circuit or the SDS application through execution on the processor.

18 Claims, 5 Drawing Sheets

PROCESS ACCELERATION FOR SOFTWARE DEFINED STORAGE

PRIORITY

The present application claims priority to U.S. Provisional Patent Application No. 63/094,618 filed Oct. 21, 2020, the contents of which are hereby incorporated in their entirety.

FIELD OF THE INVENTION

The present disclosure relates to software defined storage (SDS) and, more particularly, process acceleration for SDS such as in the context of Ceph, an open-source software storage platform.

BACKGROUND

SDS may rely on several low-level computing functions. Several of these low-level functions involve the computation of polynomial finite field mathematics, such as encoding or decoding operations. Because of the wide variety of these types of functions, they may be implemented in software using a CPU. Since SDS is concerned with making multiple copies of information, identical processes may be concurrently implemented multiple times. Further, the algorithms that are used for the computations may vary by implementation.

Inventors of embodiments of the present disclosure have discovered that software-based solutions for implementing such algorithms may have drawbacks such as delays. Embodiments of the present disclosure may address these, or other issues, present in other solutions.

DETAILED DESCRIPTION

Figure 1A:
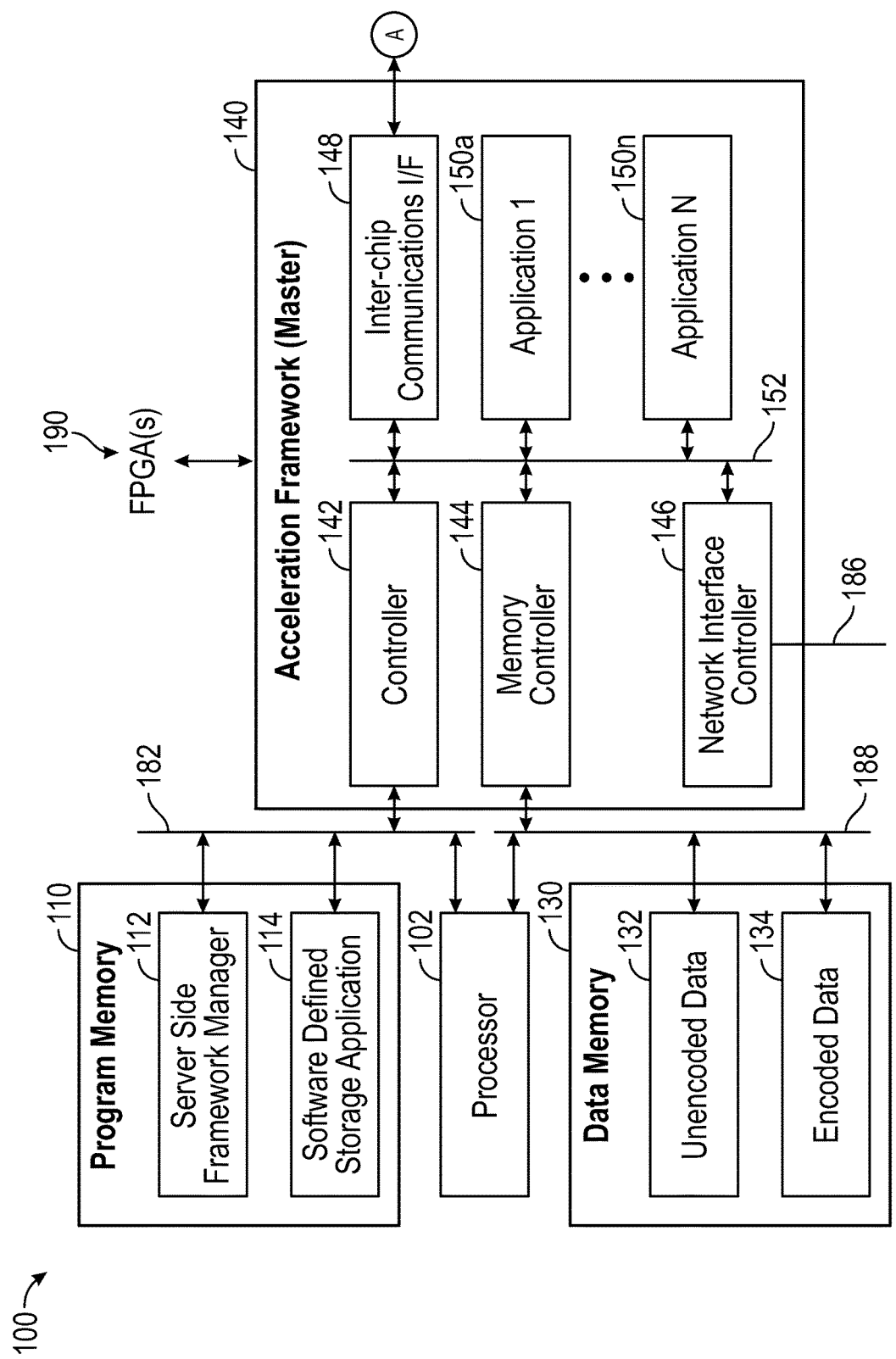
FIGS. 1A and 1B are an illustration of a system for SDS process acceleration, according to embodiments of the present disclosure.
Figure 1B:
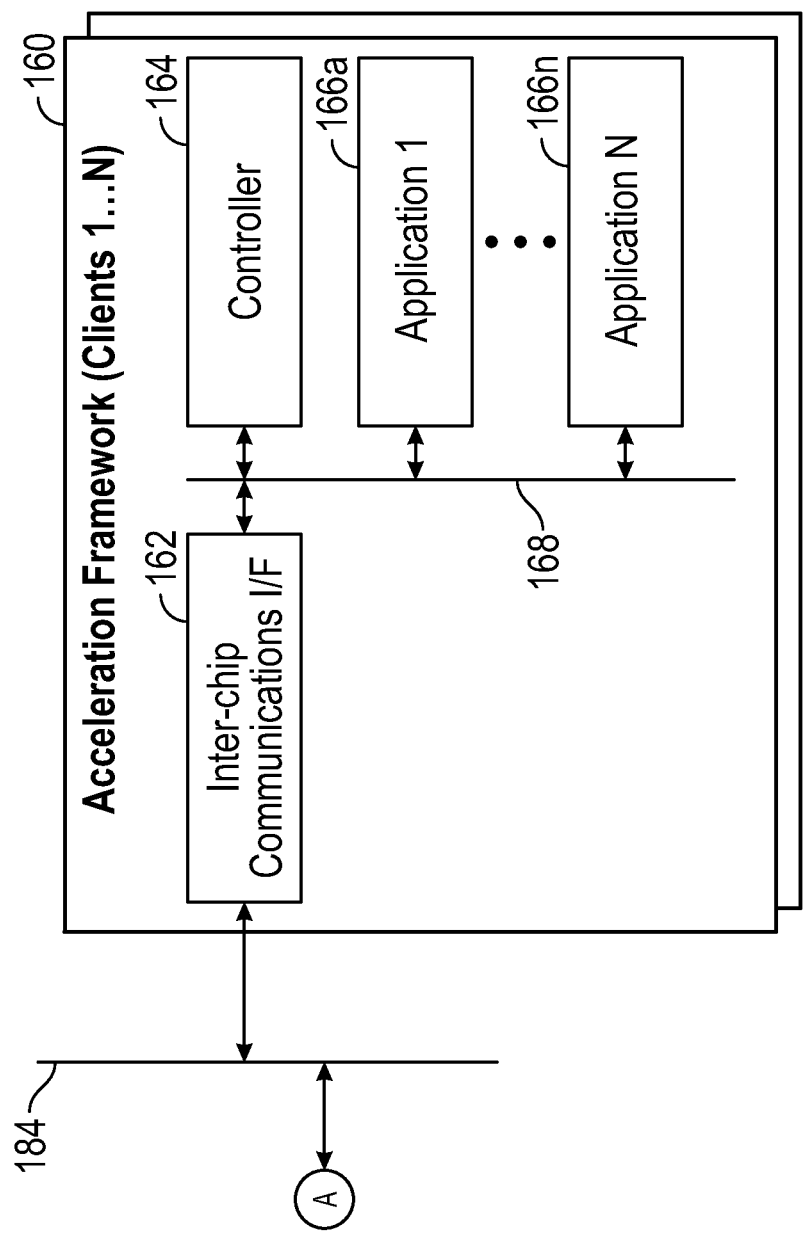

FIG. 1 is an illustration of a system for SDS process acceleration, according to embodiments of the present disclosure. The system may include a storage server 100. Although a single instance of storage server 100 is illustrated, any suitable number and kind of servers may be used to implement the system, whether such servers stand alone or are integrated together.

Storage server 100 may include a processor 102. Processor 102 may be implemented in any suitable manner. Moreover, although a single instance of processor 102 is illustrated, storage server 100 may include multiple processors working together.

Processor 102 may be communicatively coupled to a program memory 110. Processor 102 and program memory 110 may be communicatively coupled through an interface 182. Interface 182 may be implemented by analog circuitry, digital circuitry, a field programmable gate array (FPGA), an application-specific integrated circuit (ASIC), instructions for execution by a processor, or any suitable combination thereof. Interface 182 may be implemented as, for example, a processor bus. Program memory 110 may be implemented in any suitable manner, such as by random access memory (RAM), read-only memory (ROM), Flash memory, solid state drive, magnetic hard drive, or any other suitable removable or non-removable implementation. Program memory 110 may include contents that were read from further other memory, such as a non-transitory machine-readable medium storing instructions for execution by processor 102.

Program memory 110 may include instructions that, when executed, form the operation of a server-side framework manager 112 and an SDS application 114. These may be software programs executing on storage server 100. These programs may be executed by processor 102. SDS application 114 may be, for example, a Ceph application. Framework manager 112 may act as a driver for circuits, discussed below, that offload processing of processor 102. Moreover, framework manager 112 may be implemented by analog circuitry, digital circuitry, an FPGA, an ASIC, instructions for execution by a processor such as processor 102, or any suitable combination thereof, and may be referred to as control logic. Moreover, framework manager 112 may be implemented within other parts of the system, such as within the framework acceleration circuits discussed in more detail below.

Server 100 may include data memory 130. Data memory 130 may be implemented in any suitable manner, such as by random access memory (RAM), read-only memory (ROM), Flash memory, or any other suitable implementation. Data memory 130 may include data that is to be written to or has been read from storage, and data that is generated or managed by SDS application 114. Data memory 130 may include unencoded data 132 and encoded data 134. Data memory 130 may be communicatively coupled to processor 102 through interface 188. Interface 188 may be implemented by analog circuitry, digital circuitry, instructions for execution by a processor, an FPGA, an ASIC, or any suitable combination thereof. Interface 188 may be implemented as, for example, a data bus.

Server 100 may include a main acceleration framework circuit 140. Main acceleration framework circuit 140 may be implemented by analog circuitry, digital circuitry, instructions for execution by a processor, an FPGA, an ASIC, or any suitable combination thereof. Main acceleration framework circuit 140 may be communicatively coupled to program memory 110 and processor 102 through interface 182. Main acceleration framework circuit 140 may be communicatively coupled to data memory 130 and processor 102 through interface 188.

Server 100 may include any suitable number of client acceleration framework circuits 160. Client acceleration framework circuits 160 may be implemented by analog circuitry, digital circuitry, an FPGA, an ASIC, instructions for execution by a processor, or any suitable combination thereof. Each client acceleration framework circuit 160 may be communicatively coupled to main acceleration framework circuit 140 through interface 184. Interface 184 may be implemented by analog circuitry, digital circuitry, instructions for execution by a processor, an FPGA, an ASIC, or any suitable combination thereof. Interface 184 may be implemented as, for example, a data bus.

As discussed above, server 100 may be configured to perform SDS operations through execution of SDS application 114. SDS operations may rely upon several lower-level computing functions. For example, such functions may include the computation of polynomial finite field mathematics, such as encoding or decoding operations. Because of the wide variety of these functions, they may be often implemented in execution of software by processor 102. These may include software routines included in or called by SDS application 114. Furthermore, since SDS may include making copies of data in redundant storage media, identically performed processes may be concurrently implemented multiple times. For example, encoding the same data and copying it to multiple destination storage media may be performed concurrently. In addition, different operating parameters may be performed by SDS application 114 for different data based on user preferences, or different SDS applications may be implemented on server 100. This may tend to cause the routines to be typically implemented in software.

Embodiments of the present disclosure may implement hardware-based programmable elements into the execution of SDS in order to increase performance of SDS for these types of operations. This may be performed by, for example, main acceleration framework circuit 140 and client acceleration framework circuits 160. Circuits 140, 160 may offload execution of various tasks to be performed on behalf of SDS application 114. Circuits 140, 160 may be configured to operate independently of the particular algorithms to be performed for the offloaded tasks, and independently of the ongoing execution of SDS application 114. Moreover, circuits 140, 160 may offer parallel processor of multiple data streams for SDS application 114, by the nature of multiple such circuits 160 that are available.

Moreover, circuits 140, 160 may be configured to perform tasks on data for SDS application 114 as such data arrives at server 100, before such data is provided to SDS application. Circuits 140, 160 may be configured to, at the direction of SDS application 114, fetch unencoded data 132 from data memory 130, encode the data, and store the data as encoded data 134, without further intervention from SDS application 114 or processor 102. Circuits 140, 160 may be configured to encode data received through a network interface controller (NIC) 146 through any suitable network 186 and place such encoded data 134 in data memory 130 without further intervention from SDS application 114 or processor 102. Thus, processor 102 might not be needed to encode or decode data and move data between different memory locations.

Circuit 140 may be configured to process received data through NIC 146. Data may be accessed to or from data memory 132 using interface 182. Circuit 140 may be configured to send such data to or from circuits 146 through interface 184. In turn, circuits 160 may be configured to perform designated processing received on interface 184.

Operation of circuit 140 may be designated according to operational parameters provided by processor 102 or framework manager 112, but once operating, operation of circuit 140 may proceed independently and concurrently with operations of processor 102, framework manager 112, or SDS application 114. Operation of circuit 140 may be controlled locally within circuit 140 by controller 142. Controller 142 may be implemented by analog circuitry, digital circuitry, instructions for execution by a processor other than processor 102, an FPGA, an ASIC, or any suitable combination thereof. Controller 142 may receive operational parameters or commands from processor 102 or framework manager 112 and cause circuits 140, 160 to perform accordingly. Controller 142 may define functionality for various components in circuit 140 such as a DMA controller 144 to control DMA channels to or from data memory 130. DMA memory controller 144 may be implemented by analog circuitry, digital circuitry, instructions for execution by a processor other than processor 102, an FPGA, an ASIC, or any suitable combination thereof. Communication within circuit 140 may be performed using any suitable interface 152. Controller 142 may define functionality for various applications 150, which may implement any suitable data processing algorithms. Such algorithms may in turn be performed by a suitable combination of circuits 160 or by analog circuitry, digital circuitry, instructions for execution by a processor other than processor 102.

Circuit 140 and circuits 160 may include inter-chip communications interface 162 to facilitate the communication between circuits 140, 160 and the components therein. Circuits 160 may each include a controller 164 and any suitable number and kind of applications 166. Controller 164 on each of circuits 160 may be configured to receive commands from circuit 140 and controller 142 therein, or applications 150 therein, to perform various data processing to be performed by applications 166. Controller 164 and applications 166 may be implemented by analog circuitry, digital circuitry, instructions for execution by a processor other than processor 102, an FPGA, an ASIC, or any suitable combination thereof.

In one embodiment, circuit 140 and circuits 160 may dynamically implement polynomial finite field mathematical algorithms. Framework manager 112 may program circuit 140 with a selected algorithm based upon a determination of a probability of the use of the algorithm before data arrives or is to be otherwise encoded or decoded, or before requests are made by SDS application 114. This may speed up the encoding and decoding operation as the data is available prior to when SDS application 114 requests the information.

Unencoded data 132 may be retrieved by memory controller 144. The data may be processed by applications 150. Once processed, the data may be stored by applications 150 in encoded data 134 using memory controller 144. Alternatively, the data retrieved by memory controller 144 may be sent to interface 148, wherein it is sent to the corresponding interfaces 162 of circuits 160. The data may then be processed using corresponding applications 166. The data may be sent back via the respective interfaces 162 to interface 148 of circuit 140. Then, memory controller 144 may store the results in encoded data 134.

Processor 102 may be configured to access unencoded data 132 or encoded data 134. This data may be provided to SDS application 114 on-demand.

As shown in FIG. 1, multiple applications 150, 166 may be available for processing data. Controller 142 may be configured to selectively route data to the various applications 150, 166 for processing. Each of applications 150, 166 may be configured for a particular polynomial finite field mathematical algorithm. Consequently, the data may be routed through applications 150, 166 in parallel, in series, or in a combination thereof.

For example, controller 142 may be configured to retrieve data from unencoded data 132 or from inbound data streams on NIC 146. Controller 142 may be configured to route the retrieved data to application 150A that has previously been programmed with a specific compression algorithm. Output from application 150A may be routed by controller 142 to application 150N that has been programmed with a specific encryption algorithm. Controller 142 may route the output of application 150N to circuit 160A, and to applications 166 therein. Applications 166 in circuit 160A may have already been programmed with an erasure encoding algorithm. This may allow the data received by controller 164 to be processed in parallel. Finally, the outputs from applications 166 in circuit 160A may be routed by controller 164 via memory controller 142 to encoded data 134 in data memory 130.

Applications 150, 166 may be implemented by, for example, field programmable gate arrays (FPGAs), allowing reconfiguration of the associated circuits to perform different algorithms without replacing hardware.

Figure 2:
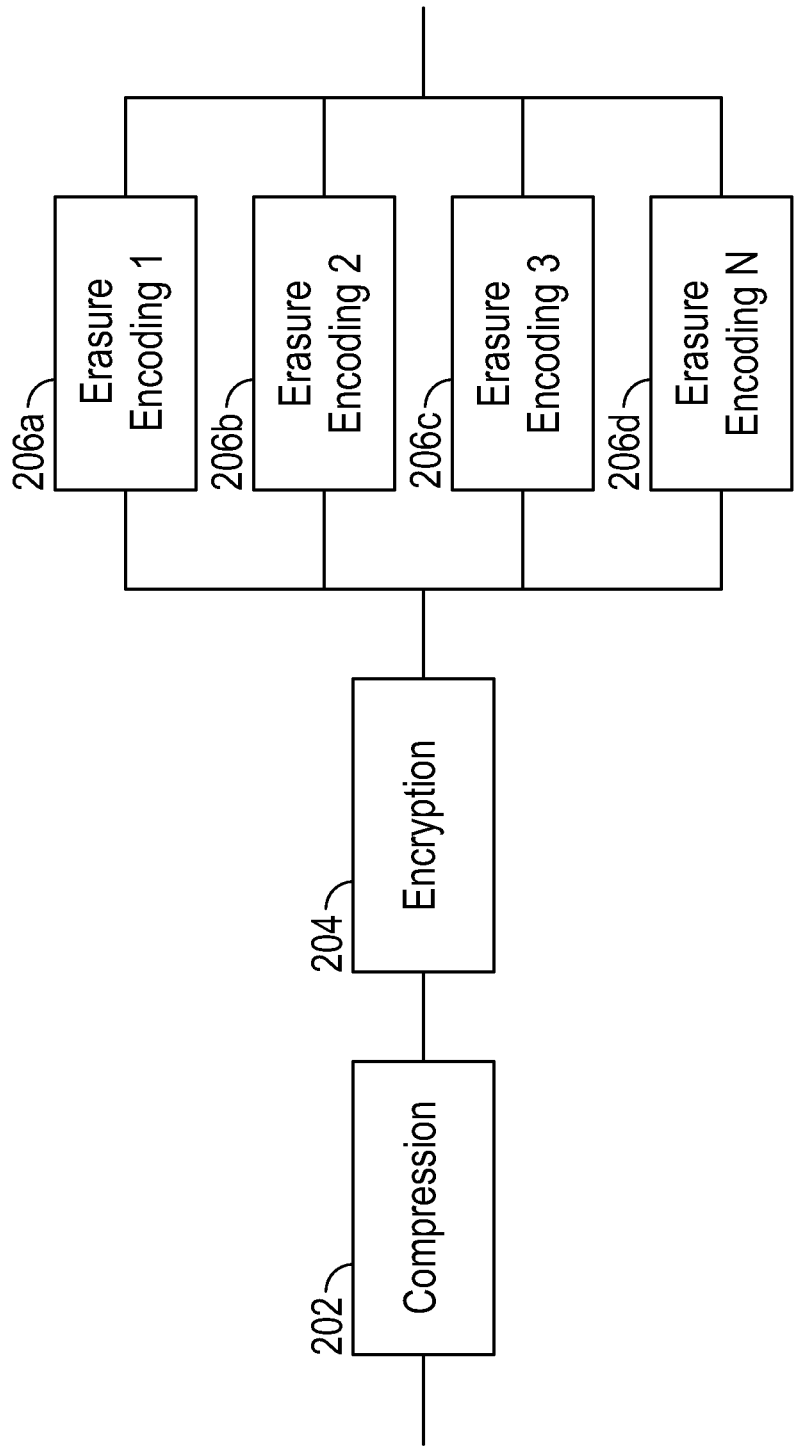
FIG. 2 illustrates example operation of serial and parallel encoding, according to embodiments of the present disclosure.

FIG. 2 illustrates example operation of serial and parallel encoding, according to embodiments of the present disclosure. In particular, FIG. 2 may illustrate the serial and parallel encoding described above with the context of FIG. 1.

Compression 202 may be performed by a first application 150A of circuit 140. Encryption 204 may then be performed by a second application 150N of circuit 140. Erasure encoding 206A, 206B, 206C, 206D may then be performed in parallel with each other by four instances of applications 166 (i.e., 166A, 166B, 166C, 166D) of circuit 160.

Compression 202, encryption 204, and erasure encoding 206 may represent common functions in SDS applications. The transformations of these applications may be performed over and over when storing or accessing data in the system. However, in some examples, a given portion of data may have to be compressed, encrypted, and erasure encoded in that sequential order. However, some of these steps may nevertheless be performed in parallel with respect to other instances of the same step. For example, after a given data portion is finished with encryption, the results of the data portion may be passed in parallel to multiple erasure encoding instances. Similarly, although not shown, as soon as some data is finished with compression, multiple instances of encryption may be available to begin processing results as such results are finished and produced by compression.

Figure 3:
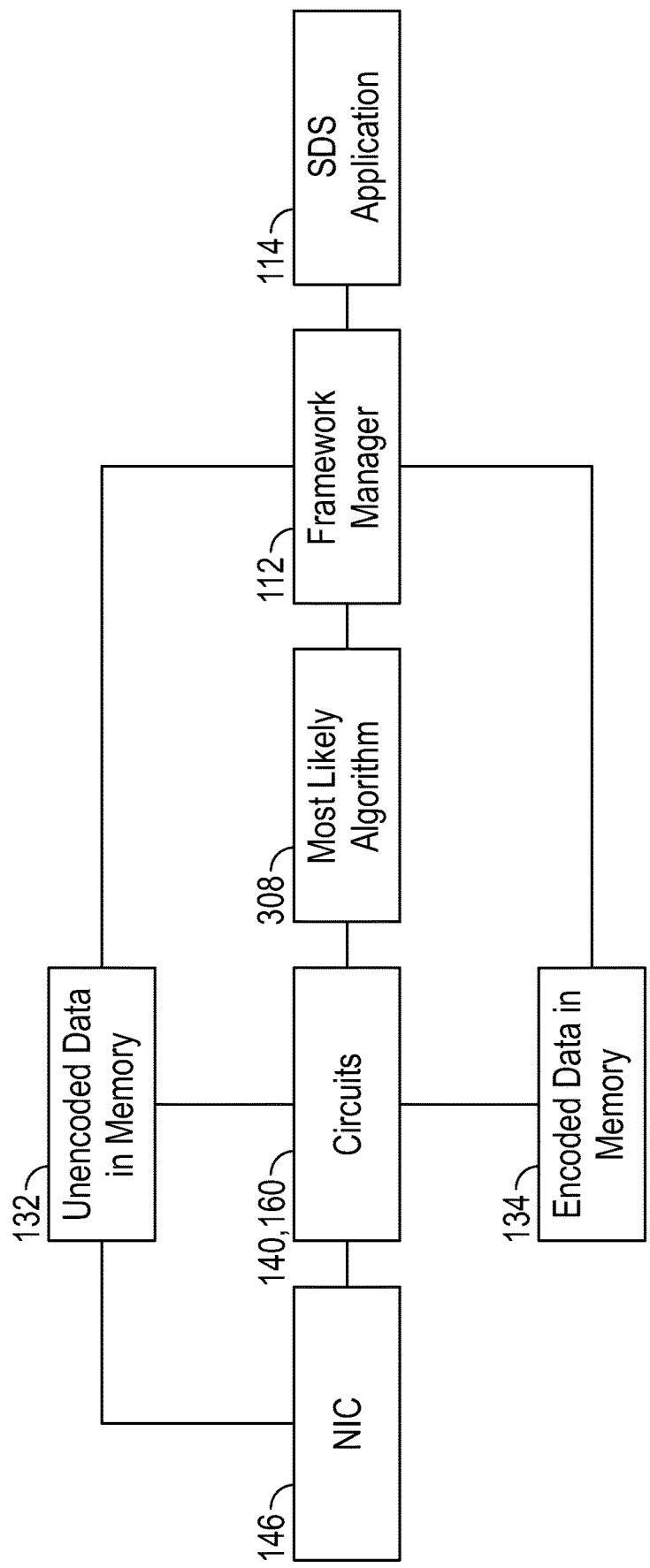
FIG. 3 illustrates example operation of preemptive encoding or decoding, according to embodiments of the present disclosure.

FIG. 3 illustrates example operation of preemptive encoding or decoding, according to embodiments of the present disclosure.

As discussed above, since circuits 140, 160 are programmable as to particular algorithms to be performed, and the data flow to the applications 150, 166 therein are programmable and selective, polynomial finite field mathematical algorithms can be implemented dynamically. Framework manager 112 may be configured to record the various algorithms used by the system, the context in which they are used, and make predictions or provide probabilities of when a given algorithm will be used. This may allow framework manager 112 to program circuits 140, 160 for upcoming operations, prior to instructions or requests from SDS application 114. The programming of circuits 140, 160 for particular algorithms may be made before requests from SDS application 114 to read unencoded data 132 or before data arrives as a data stream on NIC 146. This may speed up the encoding and decoding operations as the encoded data is available prior to SDS application 114 identifying the need thereof. Furthermore, the raw unencoded data may also be collected in parallel. Specifically, data arriving from NIC 146 may be sent to both memory 132 as unencoded data in memory and to circuits 140, 160, which may begin encoding data. The system may begin processing data, even if it is not yet known for sure what processing is required for the arrived data. The processing may be performed, as discussed below, according to a most likely algorithm 308. Some amount of data may already have been processed when an SDS application finally issues a request for what processing is to be done. If the most likely algorithm 308 is correct, some amount of processing may already have been performed in parallel with the otherwise awaiting the arrival of instructions. In cases where a predetermined or preselected algorithm is not the correct algorithm, circuits 140, 160 may be reprogrammed with a correct algorithm and the data processed. However, this overhead may be overcome by the overall efficiency gains of correctly selecting most likely algorithm 308, depending upon the success rate of selection.

In FIG. 3, framework manager 112 may be configured to determine a most likely algorithm 308 into applications of circuits 140, 160. This may be performed on the basis of most recently executed SDS operations or tasks. For example, after compression, encryption may often take place. After encryption, erasure encoding may take place. This may represent a typical or commonly used sequence of operation. Moreover, SDS application 114 may specify which algorithms are to be used. The algorithms that are used may be kept as a default for a next usage of the system, which may be used as the most likely algorithm 308. In addition, the usage of the algorithms may be tracked over time, and a most commonly used set of algorithms may be set as the most likely algorithm 308.

SDS application 114 or NIC 146 may move initial data to unencoded data 132 in data memory. Information in unencoded data 132 may then be retrieved by circuits 140, 160 and processed and stored in encoded data 134. On an interim basis, wherein data is being processed by multiple applications 150, data may be stored in unencoded data 132 or encoded data 134 as needed. Framework manager 112 may then transfer results to SDS application 114 as needed.

When data arrives from NIC 146, if capacity is available, the data may be routed to circuits 140, 160 which may begin processing the data. If capacity is unavailable, the data may be routed to unencoded data 132. Capacity may include, for example, whether circuits 140, 160 have been successively programmed with a correct algorithm.

Figure 4:
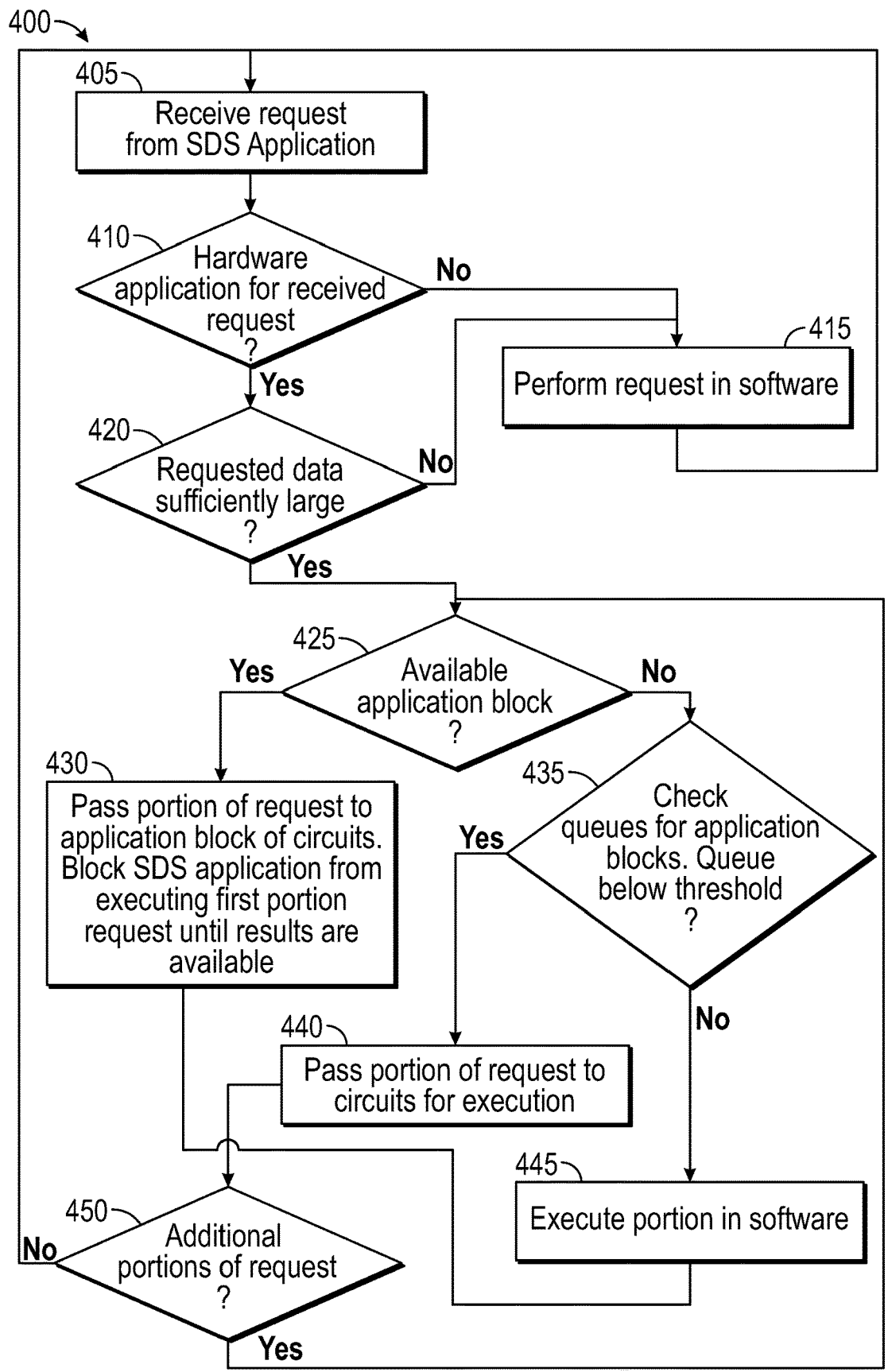
FIG. 4 is an illustration of a method for SDS process acceleration, according to embodiments of the present disclosure.

FIG. 4 is an illustration of a method 400 for SDS process acceleration, according to embodiments of the present disclosure. Method 400 may be performed by any suitable elements, such as framework manager 112 and circuits 150, 160. Method 400 may begin at any suitable step, such as step 405. Method 400 may include more or fewer steps than shown, and the steps of method 400 may be performed in a different order than shown, omitted, repeated, performed recursively, or repeatedly in multiple instances of method 400.

In step 405, framework manager 112 may accept requests from SDS application 114 to perform a given task.

In step 410, framework manager 112 may determine whether the request can be accelerated through hardware in circuits 150, 160. If not, method 400 may proceed to step 415. Otherwise, method 400 may proceed to step 420. Determination of whether the request can be accelerated may be performed in any suitable manner. For example, if the request involves an algorithm for which circuits 150, 160 may be programmed, then the request can be accelerated.

At step 415, software implementation of the request for execution by processor 102 may be performed. Method 400 may return to step 405.

At step 420, framework manager 112 may determine, given that the request can be accelerated, whether the request should be accelerated through hardware in circuits 150, 160 given various criteria. Any suitable criteria may be used. For example, framework manager 112 may consider an amount of data that will be processed. Offloading of processing to circuits 150, 160 may include some amount of overhead and latency. For small amounts of data in total to be processed, the overhead and latency of offloading of processing may be exceeded by the speed savings provided to processor 102. Framework manager 112 may compare a number of calculations or amount of data to be processed against a threshold to determine whether to offload processing to circuits 150, 160. If the request involves data that is not sufficiently large, method 400 may proceed to step 415. Otherwise, method 400 may proceed to step 425 to continue to evaluate whether or how the request should be accelerated.

At step 425, framework manager 112 may determine whether circuits 150, 160, have available resources to perform the job. FPGAs of circuits 150, 160 may be configured to offer multiple different encoding blocks, shown as applications, which may operate serially, in parallel, and independently, as discussed above. A free list of each kind of block (that is, a block for a particular algorithm or kind of request) identifying blocks that have empty queues may be available to framework manager 112, thus identifying free resources of circuits 150, 160, as well as queued tasks thereof. If there is an available application block that can be used right away to execute a first portion of the request, method 400 may proceed to step 430. Otherwise, method 400 may proceed to step 435.

At step 430, framework manager 112 may pass the request to circuits 150, 160 and block execution of SDS application 114 for the request until results are available from circuits 150, 160 for a first portion of the request. Method 400 may proceed to block 450.

At step 435, framework manager 112 may check how many jobs are queued waiting for relevant application blocks. If such a number is sufficiently low, such as below a threshold of one or two, then method 400 may proceed to step 440. Otherwise, method 400 may proceed to step 445. If there are too many jobs queued for a given application block, an error code may be returned, which may be used to determine whether to proceed to step 440. Such an error code may indicate that software execution for the portion of the request may be faster than waiting for the hardware of circuits 150, 160.

At step 440, framework manager 112 may register the request on the queue for the relevant application block and block execution of SDS application 114 for the request until results are available from circuits 150, 160. Method 400 may proceed to block 450.

At step 445, framework manager 112 may allow SDS application 114 to execute a first portion of the request. Method 400 may proceed to block 450.

At step 450, framework manager 112 may determine if there are additional portions of the request to execute. If so, method 400 may return to step 425 for processing of additional portions. Otherwise, method 400 may return to step 405.

Embodiments of the present disclosure may include an apparatus. The apparatus may include a processor, a memory communicatively coupled to the processor, an acceleration framework circuit communicatively coupled to the memory and the processor, and a device driver.

The acceleration framework circuit may be implemented by analog circuitry, digital circuitry, an FPGA, an ASIC, instructions for execution by a processor, or any suitable combination thereof. The acceleration framework may include a primary or master circuit and any suitable number and kind of client circuits. These circuits in turn may be implemented by analog circuitry, digital circuitry, an FPGA, an ASIC, instructions for execution by a processor such as processor 102, or any suitable combination thereof. These circuits may include any suitable interfaces to communicate with each other and the rest of the apparatus. These circuits may include application circuits. The application circuits may include analog circuitry, digital circuitry, an FPGA, an ASIC, or any suitable combination thereof. The application circuits may be configured to execute a part of an SDS application algorithm. The specific algorithm to be applied by a given application circuit may be configurable by the device driver. Moreover, application circuits may be dynamically arranged so as to flow data therebetween in particular sequential, parallel, or a combination of sequential and parallel order. The order of application circuit data processing may be configurable by the device driver.

The data manipulation may be for any suitable algorithms, such as those associated with distributed writing and reading of data in SDS applications.

The device driver may be implemented by analog circuitry, digital circuitry, an FPGA, an ASIC, instructions for execution by a processor such as a processor, or any suitable combination thereof. The device driver may be configured to receive a request for data manipulation by a SDS application, determine whether the request for data manipulation can be offloaded from the processor to the acceleration framework circuit, and, based upon the determination of whether the request for data manipulation can be offloaded from the processor to the acceleration framework circuit, selectively cause the request to be executed by the acceleration framework circuit or the SDS application through execution on the processor.

The device driver may be configured to determine whether the request for data manipulation is to be offloaded in any suitable manner. In combination with any of the above embodiments, the device driver may be configured to compare a number of calculations or amount of data to be processed against a threshold to determine whether to offload processing to the acceleration framework circuit. If the request involves data that is not sufficiently large, the processing of the data might not be offloaded. If the request involves data that is sufficiently large, the processing might be offloaded.

In combination with any of the above embodiments, the device driver may be configured to determine whether the acceleration framework circuit has sufficient available resources to perform the requested operations. The device driver may be configured to access a list of application circuits within the acceleration framework circuit to see whether such entities have empty queues.

In combination with any of the above embodiments, the request for data manipulation may include requests for encoding, decoding, compression, or decompression.

In combination with any of the above embodiments, the acceleration framework circuit may include programmable application circuits. The programmable application circuits may be configurable to perform a selectable SDS function.

In combination with any of the above embodiments, the programmable application circuits may be configured to be selectively aligned in series computation, parallel computation, and a combination of series and parallel computation in order to perform the request for data manipulation.

In combination with any of the above embodiments, the device driver may be configured to determine a likely next task, and to preconfigure the acceleration framework circuit to execute an SDS operation to execute the likely next task.

In combination with any of the above embodiments, the device driver may be further configured to determine the likely next task based upon an immediately prior SDS operation.

In combination with any of the above embodiments, the likely next task may be different than the immediately prior SDS operation.

In combination with any of the above embodiments, the device driver may be further configured to dynamically reconfigure the acceleration framework circuit during processing of an SDS data stream.

In combination with any of the above embodiments, the device driver may be further configured to determine whether the request for data manipulation will be offloaded from the processor to the acceleration framework circuit or executed by the SDS application through execution on the processor based upon a size of data involved in the request.

In combination with any of the above embodiments, the device driver may be further configured to dynamically select between execution of portions of the request for data manipulation to the acceleration framework circuit and execution of portions of the request by the SDS application through execution on the processor during execution of the request for data manipulation.

Those in the art will understand that a number of variations may be made in the disclosed embodiments, all without departing from the spirit and scope of the invention, which is defined solely by the appended claims.

What is claimed is:

1. An apparatus, comprising:
a processor;
a memory communicatively coupled to the processor;
an acceleration framework circuit communicatively coupled to the memory and the processor; and
a device driver configured to:
receive a request for data manipulation by a software defined storage (SDS) application;
determine whether the request for data manipulation can be offloaded from the processor to the acceleration framework circuit;
based upon the determination of whether the request for data manipulation can be offloaded from the processor to the acceleration framework circuit, selectively cause the request to be executed by the acceleration framework circuit or the SDS application through execution on the processor;
determine a likely next task; and
preconfigure the acceleration framework circuit to execute an SDS operation to execute the likely next task.

2. The apparatus of claim 1, wherein the data to be offloaded includes data to be encoded or decoded.

3. The apparatus of claim 1, wherein the acceleration framework circuit includes a plurality of programmable application circuits, the programmable application circuits configurable to perform a selectable SDS function.

4. The apparatus of claim 3, wherein the programmable application circuits are configured to be selectively aligned in series computation, parallel computation, and a combination of series and parallel computation in order to perform the request for data manipulation.

5. The apparatus of claim 1, wherein the device driver is further configured to determine the likely next task based upon an immediately prior SDS operation.

6. The apparatus of claim 5, wherein the likely next task is different than the immediately prior SDS operation.

7. The apparatus of claim 1, wherein the device driver is further configured to dynamically select between execution of portions of the request for data manipulation to the acceleration framework circuit and execution of portions of the request by the SDS application through execution on the processor during execution of the request for data manipulation.

8. An apparatus, comprising:
a processor;
a memory communicatively coupled to the processor;
an acceleration framework circuit communicatively coupled to the memory and the processor; and
a device driver configured to:
receive a request for data manipulation by a software defined storage (SDS) application;
determine whether the request for data manipulation can be offloaded from the processor to the acceleration framework circuit;
based upon the determination of whether the request for data manipulation can be offloaded from the processor to the acceleration framework circuit, selectively cause the request to be executed by the acceleration framework circuit or the SDS application through execution on the processor; and
dynamically reconfigure the acceleration framework circuit during processing of an SDS data stream.

9. An apparatus, comprising:
a processor;
a memory communicatively coupled to the processor;
an acceleration framework circuit communicatively coupled to the memory and the processor; and
a device driver configured to:
receive a request for data manipulation by a software defined storage (SDS) application;
determine whether the request for data manipulation can be offloaded from the processor to the acceleration framework circuit;
based upon the determination of whether the request for data manipulation can be offloaded from the processor to the acceleration framework circuit, selectively cause the request to be executed by the acceleration framework circuit or the SDS application through execution on the processor; and
determine whether the request for data manipulation will be offloaded from the processor to the acceleration framework circuit or executed by the SDS application through execution on the processor based upon a size of data involved in the request.

10. A method, comprising:
receiving a request for data manipulation by a software defined storage (SDS) application;
determining whether the request for data manipulation can be offloaded from a processor to an acceleration framework circuit;
based upon the determination of whether the request for data manipulation can be offloaded from the processor to the acceleration framework circuit, selectively causing the request to be executed by the acceleration framework circuit or the SDS application through execution on the processor;
determining a likely next task; and
preconfiguring the acceleration framework circuit to execute an SDS operation to execute the likely next task.

11. The method of claim 10, wherein the data to be offloaded includes data to be encoded or decoded.

12. The method of claim 10, further comprising selecting one or more programmable application circuits to perform a selected SDS function within the acceleration framework circuit.

13. The method of claim 12, further comprising causing the programmable application circuits to be selectively aligned in a combination of series and parallel computation in order to perform the request for data manipulation.

14. The method of claim 10, further comprising determining the likely next task based upon an immediately prior SDS operation.

15. The method of claim 14, wherein the likely next task is different than the immediately prior SDS operation.

16. The method of claim 10, further comprising dynamically selecting between execution of portions of the request for data manipulation to the acceleration framework circuit and execution of portions of the request by the SDS application through execution on the processor during execution of the request for data manipulation.

17. A method, comprising:
  receiving a request for data manipulation by a software defined storage (SDS) application;
  determining whether the request for data manipulation can be offloaded from a processor to an acceleration framework circuit;
  based upon the determination of whether the request for data manipulation can be offloaded from the processor to the acceleration framework circuit, selectively causing the request to be executed by the acceleration framework circuit or the SDS application through execution on the processor; and
  dynamically reconfiguring the acceleration framework circuit during processing of an SDS data stream.

18. A method, comprising:
  receiving a request for data manipulation by a software defined storage (SDS) application;
  determining whether the request for data manipulation can be offloaded from a processor to an acceleration framework circuit;
  based upon the determination of whether the request for data manipulation can be offloaded from the processor to the acceleration framework circuit, selectively causing the request to be executed by the acceleration framework circuit or the SDS application through execution on the processor; and
  determining whether the request for data manipulation will be offloaded from the processor to the acceleration framework circuit or executed by the SDS application through execution on the processor based upon a size of data involved in the request.

* * * * *